United States Patent [19]
Caron et al.

[11] Patent Number: 5,586,328
[45] Date of Patent: Dec. 17, 1996

[54] MODULE DEPENDENCY BASED INCREMENTAL COMPILER AND METHOD

[75] Inventors: Ilan G. Caron, Redmond; Alan W. Carter, Bellevue; Dennis M. Canady, Redmond, all of Wash.; Tom Corbett, Eugene, Oreg.; Rajiv Kumar, Redmond, Wash.

[73] Assignee: Microsoft Corporation, Redmond, Wash.

[21] Appl. No.: 328,171

[22] Filed: Oct. 21, 1994

[51] Int. Cl.⁶ .................................................. G06F 9/44
[52] U.S. Cl. ............................................................ 395/705
[58] Field of Search ................................ 395/700; 371/16, 371/19

[56] References Cited

U.S. PATENT DOCUMENTS

| | | | |
|---|---|---|---|
| 5,005,152 | 4/1991 | Knutsen | 364/900 |
| 5,204,960 | 4/1993 | Smith et al. | 395/700 |
| 5,325,531 | 6/1994 | McKeeman et al. | 395/700 |
| 5,367,683 | 11/1994 | Brett | 395/700 |

*Primary Examiner*—Kevin A. Kriess
*Assistant Examiner*—Kakali Chaki
*Attorney, Agent, or Firm*—Klarquist Sparkman Campbell Leigh & Whinston

[57] ABSTRACT

A compiler and compiling method minimizes recompilation of a computer program after an edit. The program is organized in plural program units, such as modules. The units are each compiled through a sequence of compilation states, including plural intermediate compilation states. In compiling each of the program units, dependencies between units are recorded in a table. When an edit to a program unit is later attempted, the edited unit is decompiled to one of various intermediate compilation states according to the edit performed. Units dependent of the edited unit are decompiled to one of various intermediate compilation states according to the dependency of the dependent unit on the edited unit. When next compiling the program, the units are compiled from their respective intermediate compilation state. Units also can be saved in various intermediate compilation states to minimize compiling when the program is again loaded.

19 Claims, 13 Drawing Sheets

MODULE DEPENDENCY BASED INCREMENTAL COMPILER AND METHOD

FIELD OF THE INVENTION

The invention relates to compiling computer programs written in a high level programming language into executable form, and, more particularly, relates to incrementally recompiling computer programs after an edit.

BACKGROUND OF THE INVENTION

Computers operate under the control of a program consisting of coded instructions. Typically, programs are first written in a high level programming language, such as BASIC, PASCAL, C, C++, or the like, which are more readily understood by humans. These high level language statements of the program are then translated or compiled into coded instructions which are executable by the computer. Typically, a software program known as a compiler is used for this purpose. The terms, "source code" and "object code," are often used to describe the form of a program prior to and after compiling, respectively. Accordingly, the term "source code" generally refers to a program in its high level programming language form. "Object code," on the other hand, generally refers to the program in the form of the coded instructions generated by the compiler which are executable on a computer.

Processes for compiling source code into executable object code are well known in the art. In a typical previous compiler, the compiler initially performs lexical analysis on the source code to separate the source code into various lexical structures of the programming language (generally known as tokens), such as keywords, identifiers, operator symbols, punctuation, and the like. Then, through syntax analysis, the compiler groups the tokens into various syntax structures of the programming language, such as expressions, declaration statements, loop statements, procedure calls, and the like. Finally, the compiler generates and optimizes code for each of these structures.

The process of compiling source code to executable object code is, for typical high level programming languages, a complex and time consuming task. Depending on the length of a program's source code and the complexity of the programming language, compiling a program may take from many seconds to many minutes. Lengthy compile times, however, are inconvenient and disruptive to programmers. When developing a program, it is often necessary to repeat the compiling process many times to remove coding and design errors, and to add further features as the program evolves from prototype to finished product. Additionally, as the program evolves, the length of the program's source code and, consequently, the compile time generally increase.

The duration of compile times can be particularly inconvenient during the process of debugging source code. When debugging a compiled program, a programmer typically makes a small change to the program's source code, compiles the program again, and tests its execution. Not uncommonly, these steps are performed repeatedly until the last error in the program is corrected. As the programmer may be left idle while the computer compiles, the time required for compiling can be an aggravating, as well as time consuming, part of the process.

With many previous compilers, the compiling process begins anew each time a program is compiled. No part of the previously compiled object code is used. Instead, the compiler repeats the compilation process from the beginning on the entire source code. As a result, the length of compile time for a program can be substantially the same regardless of whether a small change or many major modifications were made to the source code.

The Microsoft Visual Basic® version 3 language system includes a compiler which achieves shorter compile times for previously compiled programs by recompiling only a program unit which has been edited. In this language system, the source code of a program is organized into program units referred to herein as modules. Each module contains procedures, type declarations, and data element declarations. When an edit is performed to a module which can affect only the compilation of that module, the Visual Basic® version 3 compiler recompiles only the edited module. Depending on the type of edit to the module, the compiler may only repeat a portion of the compilation process for the module. Also, when an edit to a procedure within a module scan affect only the compilation of the procedure, only the edited procedure of the module is recompiled rather than the entire module. By recompiling only an edited program unit, the program may recompile in a shorter time than is required for a complete recompile of the entire source code.

A drawback to the approach in the Visual Basic® version 3 language system is that many edits to a module or its procedures can affect the compilation of other modules and their procedures. In such a case, the Visual Basic® version 3 language system recompiles all the modules of the program, whether or not the edit would actually affect a particular module.

Yet another drawback of previous compilers is that programs are generally saved to a mass storage device in either uncompiled source code form, or in an executable object code form. With a type of compiler sometimes referred to as an interpreter, programs typically are saved in source code form. (The term compiler is used herein to refer to any software program whose purpose is to translate program code whether typically categorized as a compiler or an interpreter.) Each time the saved source code is loaded for execution, the compiler must additionally repeat the compiling process anew (whether or not any edit is made to the program). Accordingly, loading programs saved as source code for execution is slow.

Other compilers can save programs to a mass storage device in object code form. Whereas source code can generally be compiled to execute on any type of computer (assuming a suitable compiler is available), object code is generally executable on only a specific type of computer. (The form of a program which is specific to a particular computer type is herein referred to as native code.) For example, object code which is native to computers using an Intel 80×86 type microprocessor, will not execute on computers using a Motorola 680×0 type microprocessor. Accordingly, programs saved as object code are generally lacking in portability (not easily transferrable) to other types of computers.

Another drawback of some previous compilers is that an entire program must be loaded, compiled and executed, even when it is desired to execute only a part of the program.

An object of the invention is to reduce the time for compiling a program after an edit. Another object of the invention is to make the time for compiling a program after an edit generally related to the extent of the edit. A further object is to reduce the compile time of programs which are loaded for execution. A further object is to recompile only those portions of a program actually affected by an edit, and only to the extent each portion is affected by the edit.

SUMMARY OF THE INVENTION

The present invention provides a compiler and method which corrects these and other shortcomings of prior art compiling techniques. According to the invention, a program's source code is written in a high level language organized in a plurality of program units. A compiler compiles each of the program's units through a sequence of plural compilation states. While compiling a program, the compiler creates an import table for each constituent unit of the program in which it records data relating to dependencies of the unit's source code on that of another unit, and the types of the dependencies. Alternatively, the compiler can record data in a unit's import table related to dependencies of the unit's source code on members of another unit, and the types of the dependencies.

After the program's source code is edited, the compiler utilizes the import table in again compiling the program, to determine which units to recompile and the amount of recompilation needed. Edited units are recompiled. The compiler also recompiles units having a dependency affected by an edit. The edited units are decompiled to an intermediate compilation state according to the type of edit performed. Units that are dependent on an edited unit are decompiled to an intermediate compilation state according to the types of their respective dependencies affected by the edit, then recompiled from their respective states. Accordingly, with the compiler according to the invention, it is possible to again compile an edited program by only partially recompiling portions of its source code. As a result, recompile time is minimized and generally related to the extent of program editing.

According to a further aspect of the invention, the units of a program are saved to a mass storage device in any of one or more of the intermediate compilation states. When later loaded from the mass storage device, the program units need only be partially compiled from their respective intermediate compilation states. Thus, the program may load faster than with previous compilers in which programs are saved as source code. Further, in their intermediate compilation states, the program units are in an intermediate form of code ("pseudo-code") designed to be executed by a "virtual machine" engine which emulates instructions of such intermediate code. At run time, the program code in the final compilation state is executed by the virtual machine engine which implemented in the native code of a particular type of computer. Virtual machine engines may be provided for each of various types of computers. Accordingly, the programs saved in intermediate compilation states also are more easily ported to other computer types.

Additional features and advantages of the invention will be made apparent from the following detailed description of a preferred embodiment which proceeds with reference to the accompanying drawings.

DETAILED DESCRIPTION OF A PREFERRED EMBODIMENT

Figure 1:
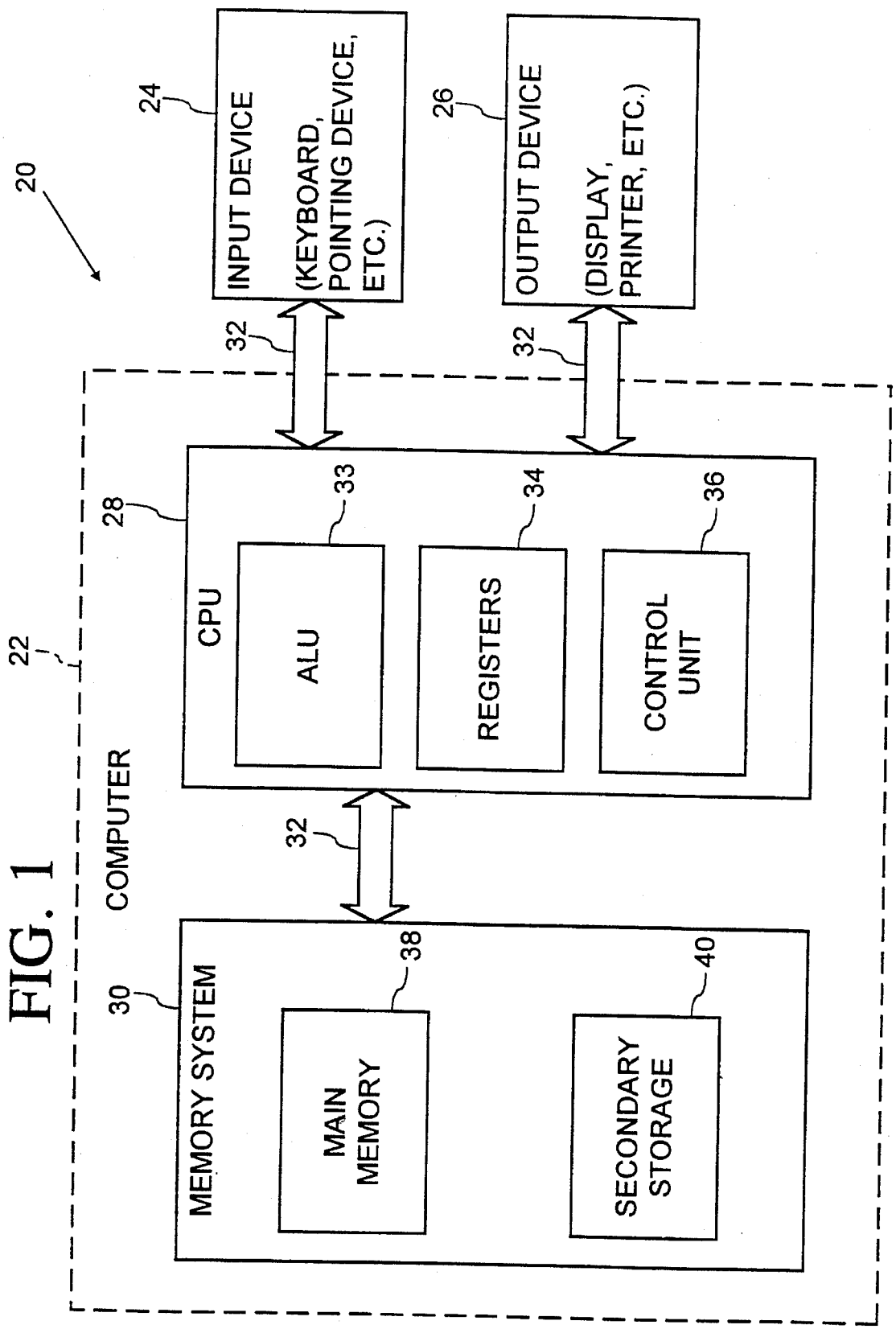
FIG. 1 is a block diagram of a computer system that may be used to implement a method and apparatus embodying the invention for recompilation after an edit.

FIG. 1 is a block diagram of a computer system 20 which is used to implement a method and apparatus embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application program or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical or magnetic recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, printer, sound device or other device for providing output data from the computer.

It should be understood that FIG. 1 is a block diagram illustrating the basic elements of a general purpose computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which these parts of the CPU are integrated together, such as in a microprocessor. Moreover, the number and arrangement of the elements of the computer system may be varied from what is shown and described in ways known in the art (i.e., multiple CPUs, client-server systems, computer networking, etc.).

Figure 2:
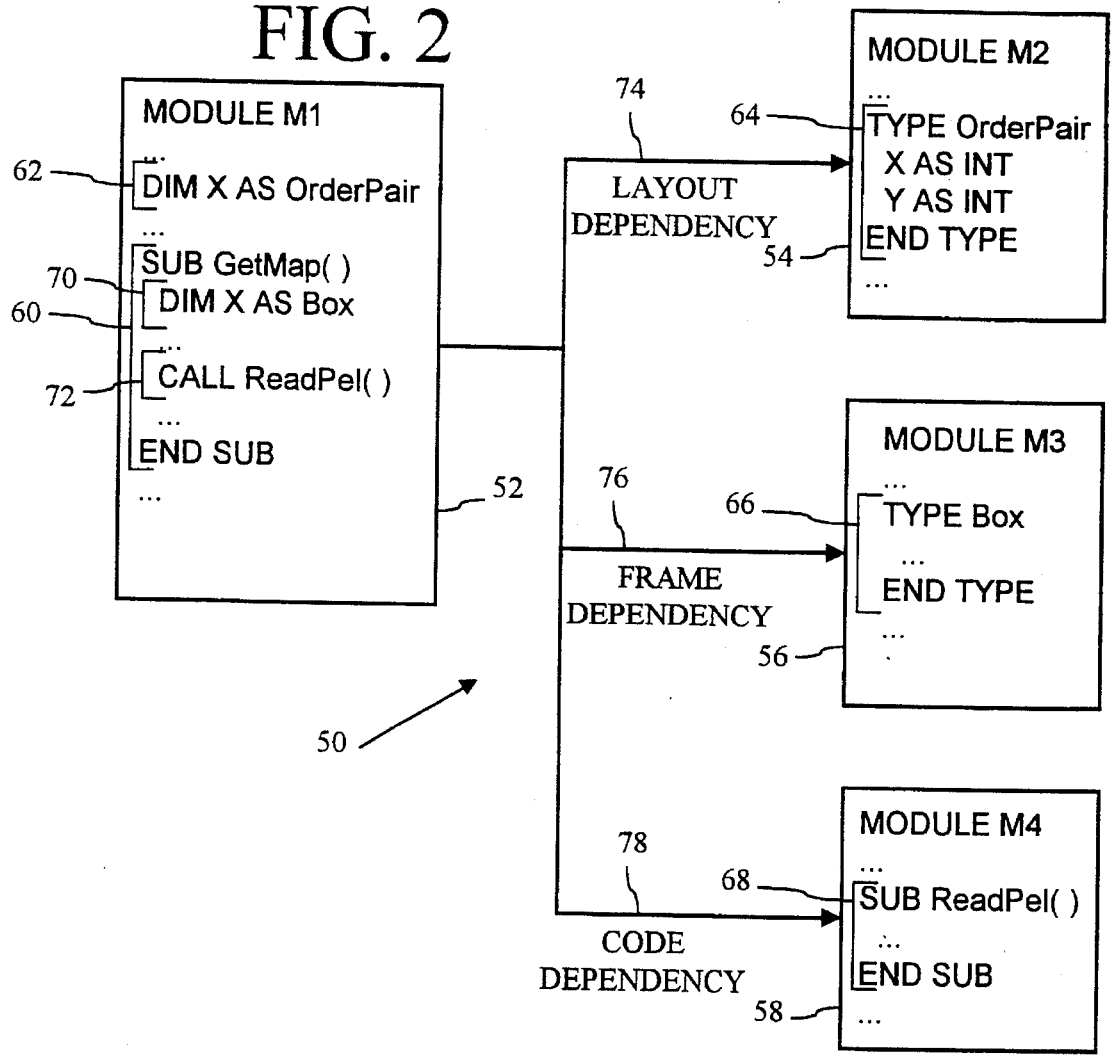
FIG. 2 is a block diagram of modules in an exemplary program's source code having intermodule dependencies.

With reference to FIG. 2, an exemplary source code 50 for compiling by the invention into executable code of a computer program includes statements in a high level programming language which are grouped into a plurality of program units. In the preferred embodiment of the invention, the source code 50 is written according to a syntax of Microsoft's Visual Basic for Applications (tm) language system. The principles of the invention are, however, applicable to compilers for source code written in other high level programming languages. Also, in the preferred embodiment, the program units into which the source code 50 is organized are modules 52, 54, 56, and 58. The principles of the invention, however, also are applicable to source code organized in various other program units, such as objects, classes, blocks, files, procedures, and etc.

A module in the preferred programming language is a container for related procedures, types, and data (referred to as module "members"). In the source code 50, for example, the module 52 contains as members: a "GetMap ( )" procedure member 60, and an "x" data member 62. The module 54 contains an "OrderPair" type member 64. The module 56 contains a "Box" type member 66. The module 58 contains a "ReadPel ( )" procedure member 68.

Data members of a module can be constants, variables, or records, and are typically declared in statements such as the following:

$$\text{Public anInt As Integer} \tag{2}$$

$$\text{Private aNum As Double} \tag{3}$$

Type members are record declarations, such as the following:

$$\begin{array}{l}\text{Type bar}\\\quad\text{x As Integer}\\\quad\text{y As Single}\\\text{End Type}\end{array} \tag{4}$$

Constants, variables, and arrays of constants and/or variables are intrinsic (i.e. language defined) data elements of the programming language. Records are data elements defined by a type as a collection of intrinsic data elements, and/or other records.

Procedures in the preferred programming language are groups of statements for performing one or more operations. (The preferred programming language refers to procedures which return a value as a "function." For expository convenience, the term "procedure" is used herein to refer to both procedures and functions.) The statements include language defined operations on intrinsic data elements, calls to other procedures, and the like. Procedures may also include declarations of local variables used within the procedure. For example, local variables in procedures are declared in statements such as the following:

$$\text{Dim anInt As Integer} \tag{5}$$

which appear within a procedure statement such as the following:

$$\begin{array}{l}\text{Sub foo (i As Integer)}\\\quad\ldots\\\text{End Sub}\end{array} \tag{6}$$

In the preferred programming language, statements in one module of the source code 50 may make reference to members of another module. For example, the declaration statement of the data member 62 in the module 52 makes reference to the type member 64 of the module 54. A declaration of a local variable "x" 70 in the procedure 60 of the module 52 refers to the type member 66 of the module 56. The procedure 60 also includes a "ReadPel" procedure call 72 which references the procedure member 68 of the module 58. Such statements which reference another module's members can create dependencies for compiling purposes. In other words, the compiled form of a module can become dependent on the source code of another module by including a statement which references one of the other module's members. (The module containing the statement which refers to another module's member is called a "dependent" module, while the module whose member is referenced by the statement is called a "provider" module.)

In the preferred embodiment of the invention, three different types of intermodule dependencies are considered: layout, frame, and code. A module has a layout dependency if its layout in object code (i.e. the size of storage allocated for each instance of the module at compile time and, in addition, the offset of members within the instance) depends on one or more statements in another module. Layout dependencies are commonly created by statements declaring static data members (i.e. data members whose storage is allocated at compile time) of a module. The declaration statement for the data member "x" 62 of the module M1 52, for example, creates a layout dependency 74 for the module M1 52 because its layout size can vary depending on the definition of the "OrderPair" type member 64 of the module M2 54. When the type member "Order Pair" 64 is defined as illustrated in FIG. 2, the data member "x" 62 is a record having two integer variables, x and y (which, in the preferred embodiment are 2-bytes each). However, if the definition of the type member "Ordered Pair" 64 is changed, such as to a record having two 8-byte floating-point variables, the size of the layout of the module M1 52 in object code changes correspondingly. The offsets of members (e.g. 60, 62) also may change.

Frame dependencies are commonly created by statements declaring local variables of a procedure. The declaration statement for local variable 70 ("X") in the module M1 52 which references the type member 66 ("Box") in the module M3 56, for example, creates a frame dependency of the module M1 52 on the module M3 56. With a dependency of this type, a change to the definition of a member of another module doesn't affect the layout of a module, but may affect the frame of a procedure member of the module. A frame is a block of storage allocated dynamically (i.e. at run time) out of stack memory for each activation of a procedure. (The stack memory may be a portion of the main memory 38 of the computer system 20 which is set aside by the operating system for accessing data in a last-in, first-out order, such as by push and pop operations.) Storage for the local variables of a procedure, for example, is provided in the procedure's frame. Therefore, a change to the source code in another module may alter the amount of storage to be allocated at run time for the procedure and the offsets of the procedure's local variables, and not the layout of the module.

Code dependencies are commonly created by procedure calls, and other statements for which the amount of static or dynamic storage of the module is not altered by a change to another module, but for which a static address may be altered. For example, the "ReadPel( )" procedure call 72 in the module M1 52 creates a code dependency on the procedure member "ReadPel( )" 68 of the module M4 58. In the object code for the module M1 52, storage is statically allocated for an address of the procedure member "ReadPel( )" 68 of the module M4 58. A change in the source code of the module M4 58 may alter the address of the procedure member 68, but not the size of storage required for the address in the procedure call 72 if the module M1 52.

Figure 3:
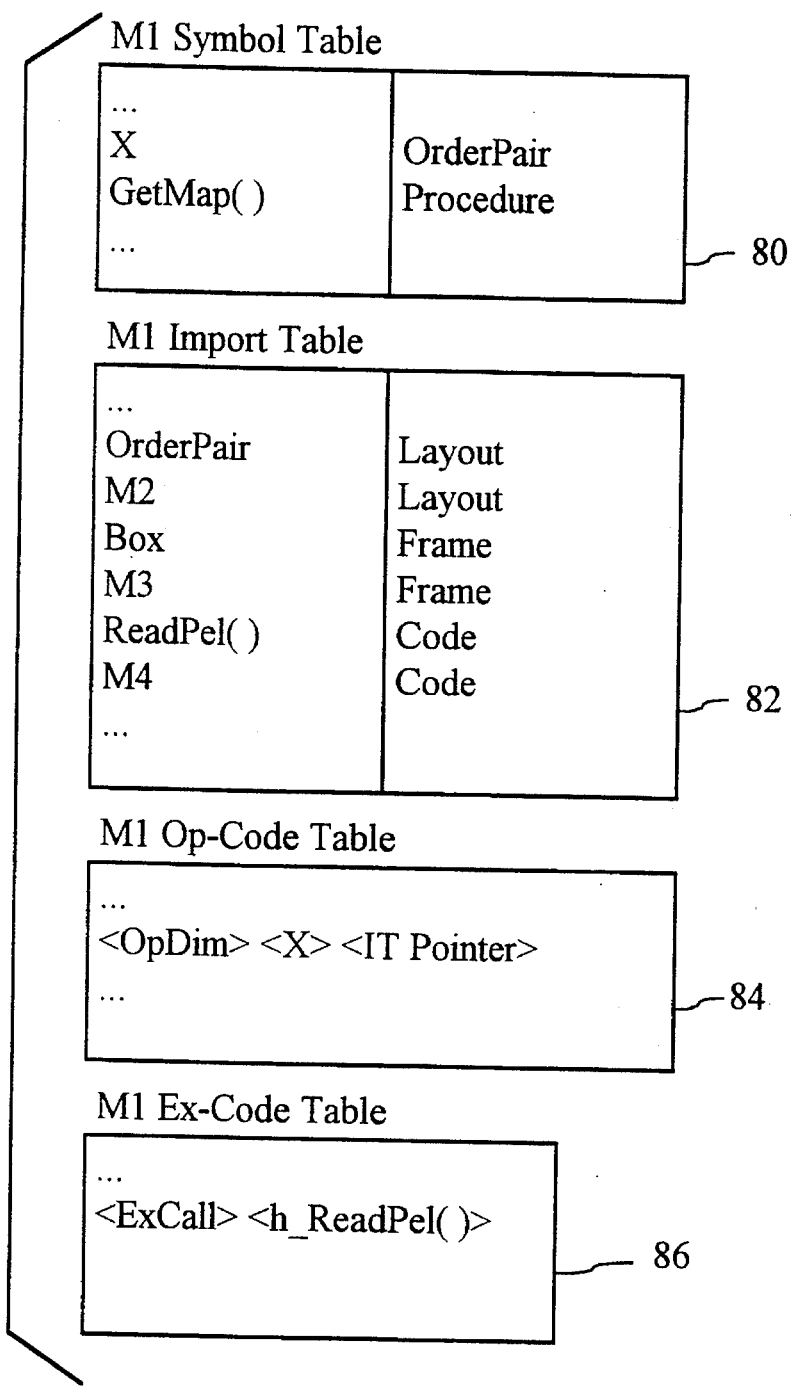
FIG. 3 is a block diagram of a symbol table, an import table, an opcode table, and an excode table generated by a compiler according to a preferred embodiment of the invention for compiling of a module in the exemplary source code of FIG. 2.
Figure 4:
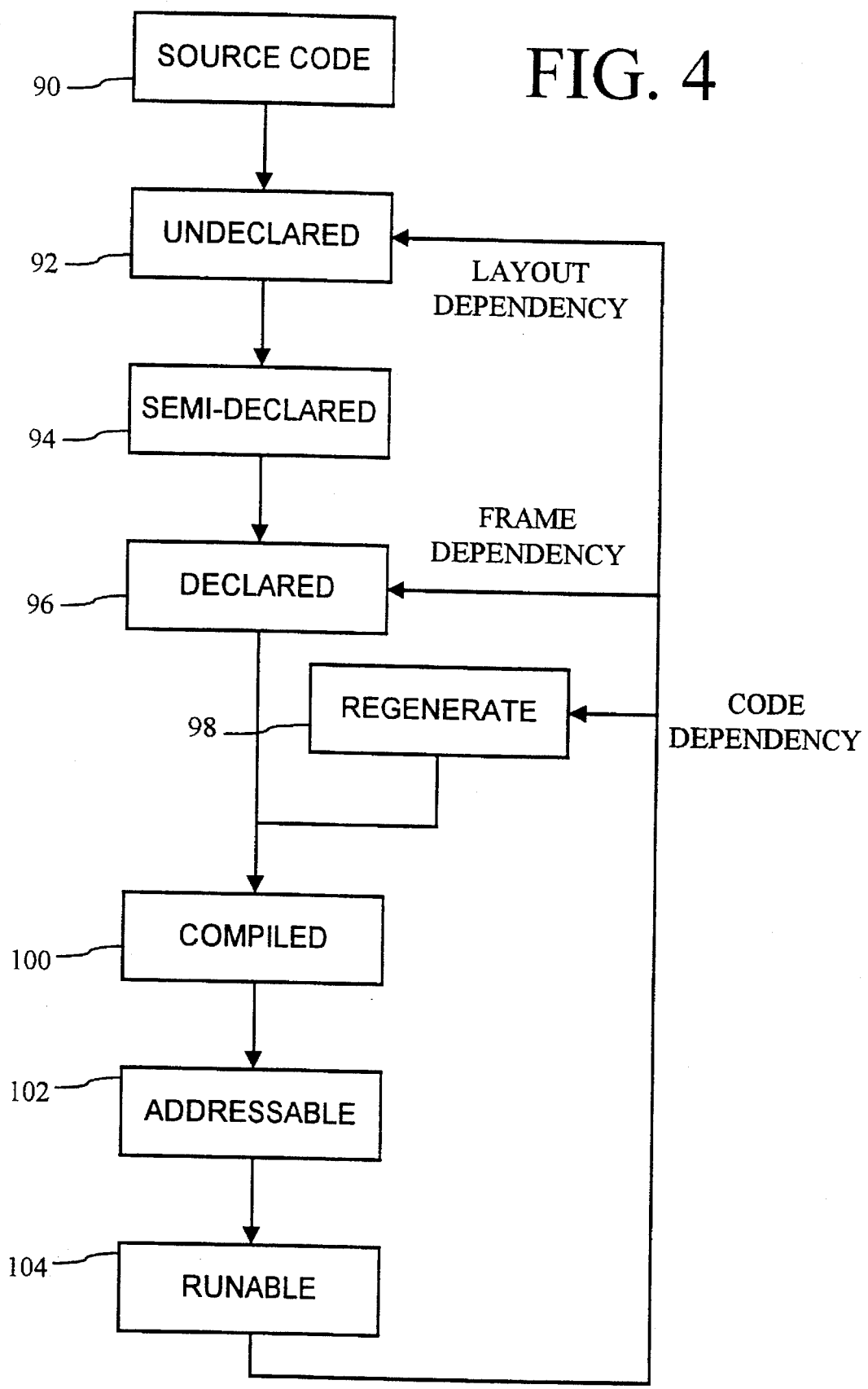
FIG. 4 is a compilation state diagram of a method according to a preferred embodiment of the invention for compiling the exemplary source code of FIG. 2 and using the tables of FIG. 3.
Figure 5:
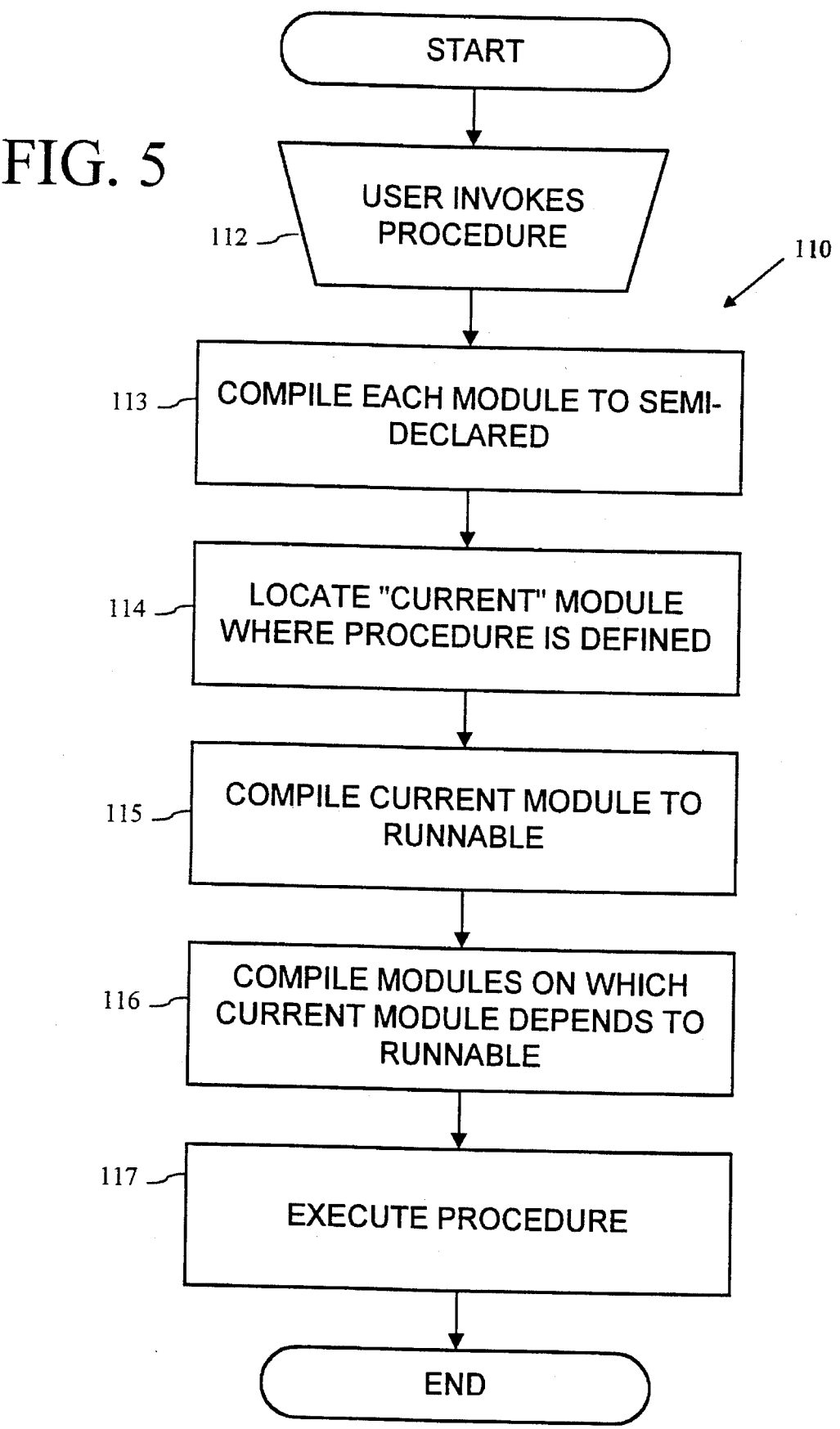
FIG. 5 is a flow chart of a method for compiling source code through the compilation states illustrated in FIG. 4 according to a preferred embodiment of the invention.

With reference to FIGS. 3–5, the source code 50 is compiled, according to the invention, through a sequence of compilation states 90–104 into executable object code. The compiling is performed on a module basis. More specifically, each module 52, 54, 56, and 58 of the source code is brought separately through the sequence of compilation states (as described in more detail below with reference to FIGS. 5–10). Preferably, the compiling is performed by a software program known as a compiler (not shown) running on the computer system 20. In the preferred embodiment of the invention, the compiler is combined with a text editor and other development tools in a software program referred to as an integrated development environment.

Referring particularly to FIG. 3, while compiling a module, such as the module 52 of the source code 50, the compiler generates a symbol table 80, an import table 82, an opcode table 84, and an excode table 86. In the preferred embodiment, a separate set of these tables is generated for each module being compiled. Alternatively, the tables for plural modules can be combined into a single set of tables.

In the symbol table 80, the compiler stores data indicative of the names and attributes of the members of the module, and of the local variables of its procedure members. In the import table 82, the compiler stores data related to dependencies on other modules. The compiler stores a form of the program referred to herein as opcode in the opcode table 84, and a form of the program herein referred to as excode in the excode table 86. In the preferred embodiment, the symbol and import tables 80, 82 are each implemented with an array and hash table. However, other conventional data structures, such as trees, lists, etc. can be suitably used to implement the tables 80, 82, 84, and 86.

Referring again to FIGS. 3 and 4, the initial state of the program is referred to herein as its source code state 90 (FIG. 4). This is the state in which a program is input by a user into the computer system 20 (FIG. 1). Preferably, the text or source code 10 is entered using the text editor of the integrated development environment of the preferred embodiment using the input device 24 (FIG. 1). This is also the state in which the program is displayed to the user on the output device 26 (FIG. 1). In this state, the program is in the form of text written in a high level programming language. None of the tables 80, 82, 84, or 86 (FIG. 3) have yet been generated.

As the user inputs the source code, the compiler performs lexical analysis on the source code to group characters of the source code into lexical constructs (also known as "tokens") of the programming language, including identifiers, keywords, operators, literals, comments, and the like. Processes for lexical analysis of source code are well known in the art. Such conventional lexical analysis processes can be suitably applied in the compiler of this invention. The tokenized form of the program (which is herein referred to as opcode) is stored in the opcode table 84 (FIG. 3). For example, the opcode form of the declaration statement for the data member 62 of the module 52 (FIG. 2) is shown in its opcode form in the table 84 of FIG. 3. After lexical analysis is performed, and the opcode tables generated, the program is in the undeclared state 92 (FIG. 4).

In the preferred embodiment of the invention, programs are represented in source code form only at the user interface level. More specifically, while programs are initially input in source code form, the compiler automatically converts the program into op-code for purposes of its internal representation. The op-code is then the initial state in which the program is stored in the main memory 38 (FIG. 1) of the computer system 20. For display to the user on the output device 26 (FIG. 1), the compiler converts the portion of the program being viewed back to its source code form. The source code of the program, however, is not stored by the compiler in the preferred embodiment.

The compiler also performs a process known in the art as binding of names and types. Processes for performing binding are known in the art, and can be suitably applied to this invention. In the binding process, the compiler analyzes declaration statements in the source code 50, such as the declaration statements of the type and data members 62, 64, and 66 (FIG. 2), which assign a name (by which it can be referenced by other statements of the source code) to a program element (i.e. module members, local variables, or the like) and a type (i.e., integer, floating point, program defined record, or etc.). From this analysis, the compiler determines the name and type assigned to a program element, and stores data indicative of the name and type in the symbol table 80 (FIG. 3). The data stored in the symbol table is later used by the compiler to determine which program elements are available in a particular module.

The symbol tables 80 are built when the compiler brings the program from the undeclared state 92, to the semi-declared and declared compilation states 94 and 96. In the undeclared state, the symbol tables 80 for the program's modules have not yet been built. In bringing modules of the program to the semi-declared state 94, the compiler enters data into each module's symbol table 80 indicative of the names of its members. For example, to bring the module M1 52 to the semi-declared state 94, data indicative of the names assigned to the data member 62 and procedure member 60 of the module M1 52 (e.g. the names "x" and "GetMap" are entered into the symbol table 80 (FIG. 3) for the module M1. Therefore, when a module is in the semi-declared state, the names of its program elements have been stored in its symbol table. With this information in the symbol table 80, the compiler can determine if a particular name has been declared for a program element in the module M1 52.

To then get to the declared state 96 (FIG. 4) of a module, the compile r also determines the types of its program elements from their declaration statements, and stores data indicative of such types in the symbol table 80 (FIG. 3). For example, in compiling the module 12 (FIG. 2) to the state 96, the compiler stores data related to the types of its members 60, 62 in the symbol table 80 (e.g. data identifying the members as being of the types "OrderPair" and "Procedure"). With the type information in the symbol table 80, the compiler can determine the amount of storage required for the members of the module being compiled, and hence the size of the module's layout and the offsets of members within the module. This type information determines offsets of the module's members within its excode, which information can be made available in compiling other modules. The values of constants declared in the module also are evaluated in the transition to the declared state 96.

In a transition to the next or compiled state 100 (FIG. 4), the compiler performs syntax analysis to group the op-code in the op-code table 84 (FIG. 3) into various syntax structures, and generates excode corresponding to the syntax structures. Processes for syntax analysis, as well as code generation and optimization are known in the art, and can be suitably applied to the generation of the excode in the invention. The compiler stores the excode it generates in the excode table 86. However, in the compiled state 100, storage for the module in memory is not yet allocated. Accordingly, addresses of the modules members have not yet been assigned.

From the compiled state 100, a module is brought to the addressable state 102 by allocating storage for the module in memory. This assigns addresses for each of the module's members by which the members can be referenced by the ex-code of other modules. However, in this state, any references in the module's excode to another module or its members are not still incomplete. The compiler finally brings a module to the runable state 104 by providing addresses in its excode for all references to another module's members. These other modules must already have been compiled to the addressable state 102 for such addresses to be available.

In the preferred embodiment, the excode is in the form of a virtual machine code. Specifically, the excode is in the form of coded instructions for a "virtual" machine, and not coded instruction in the machine language of the actual computer on which the code is to be run. To run the excode on an actual computer, an interpreter program or virtual machine engine written in machine code specific to the computer system 20 (FIG. 1) is used which performs each excode operation. By compiling programs to ex-code executable on a virtual machine, the preferred embodiment of the invention provides portability of the compiled code between various types of computers. Only a minimal additional cost of emulating the virtual machine on a specific computer system is imposed. Accordingly, the preferred embodiment provides the benefits of both speed and portability.

Referring to FIGS. 2 and 3, according to the invention, the compiler additionally generates an import table 82 for each module being compiled. As described above, the module M1 52 includes various statements 62, 70 and 72 which reference members 64, 66 and 68 of other modules M2 54, M3 56, and M4 58 and thereby create dependencies on those modules. While performing type binding and code generation in the transitions to declared and compiled states 96, 98 (FIG. 4), the compiler determines that statements of one module reference members defined by another module by searching the symbol tables of each module in the source code 50. When a statement references members of another module, the compiler also determines the type of the dependency created by the statement.

Any layout dependencies of a module are detected by the compiler while performing type binding in the transition of the module from the semi declared state 94 (FIG. 4) to the declared state 96. As described above, statements which declare a data member of a module to be of a type defined by a type member of another module create a layout dependency (such as layout dependency 74 created by the statement 62 in the module M1 52 of FIG. 2). To record the existence of such layout dependencies, the compiler stores data in the import table of the dependent module. In the preferred embodiment of the invention, this data indicates the type member and other module on which the data member's declaration depends, as well as indicating that the dependency is a layout dependency. For example, for the dependency created by the reference in the statement 62 in the module M1 52 to the "OrderPair" type member 64 of the module M2 54, the compiler stores data in the import table 82 (FIG. 3) of the module M1 52 indicating a layout dependency of that module on the "OrderPair" type member 64 of the module M2 54.

Frame and code dependencies (e.g. dependencies 76, 78 in FIG. 2) are detected by the compiler in the transition of a module to the compiled state 100 (FIG. 4). As described above, declaring a local variable in a module's procedure to be of a type defined by a type member of another module creates a frame dependency (such as the frame dependency 76 created by the local variable declaration 70 in the module M1 52 of FIG. 2). Additionally, a procedure call within a module's procedure member which invokes a procedure defined by another module's procedure member creates a code dependency (such as the code dependency 78 created by the procedure call 72 of the module M1 52). Such frame and code dependencies also are recorded by the compiler in a module's import table with data indicating the module, module member, and type of the dependency. For example, for the frame dependency 76 created by the local variable declaration 70, the compiler records data in the module M1's import table 82 (FIG. 3) indicating a frame dependency on the "Box" type member 66 of the module M3 56. As another example, for the code dependency 78 created by the procedure call 72, the compiler records data in the module M1's import table 82 indicating a code dependency on the "ReadPel( )" procedure member 68 of the module M4 58.

In the preferred embodiment of the invention, when a module has more than one dependency on a respective other module, the compiler records only the dependency having the highest precedence. The order of precedence is according to the amount of recompilation that is performed after an edit affecting the dependency. Layout dependencies require the greater amount of recompilation of a dependent module after an edit, and therefore are highest in the order of precedence. Frame dependencies are next in the order of precedence, followed by code dependencies which require the least recompilation of the dependent module. Accordingly, if a dependent module has a frame and a layout dependency on a provider module, only the layout dependency is recorded in the dependent module's import table.

Referring to FIGS. 5–10, the compiler in the preferred embodiment of the invention utilizes a method 110 to compile a program through the series of compilation states 90–104 (FIG. 4) described above. As indicated at a step 112 of the method 110 (FIG. 5), compilation is initiated by the user invoking a procedure of the program for execution on the computer system 20 (FIG. 1). In the preferred embodiment, a user selects and invokes the procedure through commands (such as a menu selection) provided in the user interface of the integrated development environment. The compiler then proceeds to compile the program through a sequence of steps 113–117 to bring the program to a state where the procedure can be run on the computer system 20.

First, at step 113–114, the compiler determines which of the modules in the program has the invoked procedure as a member. To make this determination, the compiler first compiles each of the modules in the program to the semideclared state 94 (FIG. 4). (At this point, the modules already are in the undeclared state 92 since the conversion to undeclared is performed automatically as the source code is entered into the computer system 20.)

Figure 10:
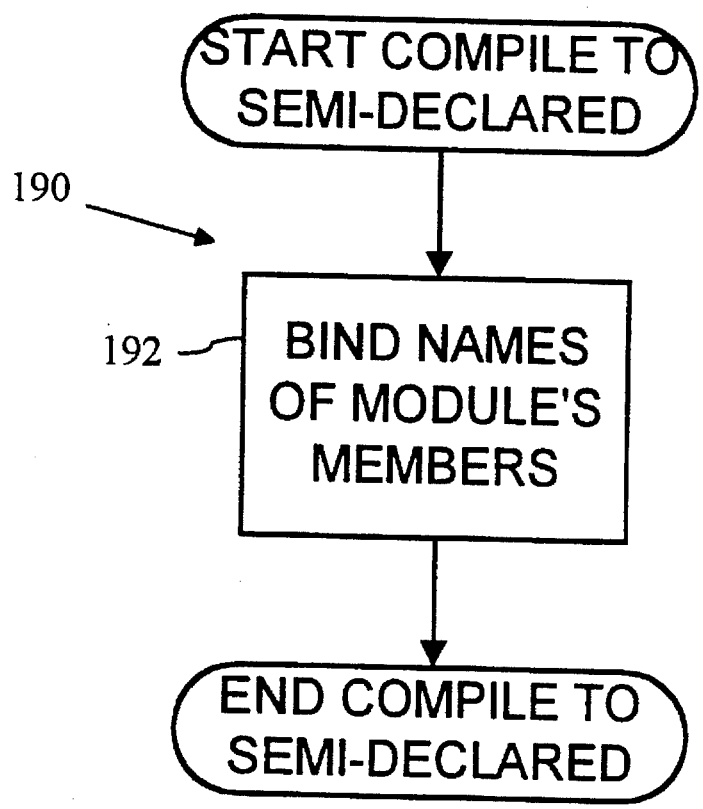
FIG. 10 is a flow chart of a portion of the method of FIG. 5 for compiling to a semi-declared state.

FIG. 10 shows a method 190 by which the compiler compiles each module to the semi-declared state 94. As indicated at step 192 of the method 190, modules are compiled to the semi-declared state 94 by binding the names of the module's members. As described above with reference to FIG. 4, in binding the module member's names, the compiler generates a symbol table for the module (e.g. symbol table 80 in FIG. 3 for module M1 52) in which the names declared for each of the module's members are recorded.

Referring again to FIG. 5, at step 114 after symbol tables for the modules of the program have been generated, the compiler searches the symbol tables to find the name of the procedure which was invoked by the user in step 112. The module whose symbol table contains this name is the module (referred to hereafter as the "current module") having the invoked procedure as a member (i.e. the module in which the invoked procedure is defined).

At a next step 115, the compiler proceeds to compile the module having the invoked procedure as a member to the runable state 104. The compiler performs the compilation to the runable state by applying methods 120, 140, 150, and 170 illustrated in FIGS. 6–9. In step 116, the compiler also performs the compilation to runable for each module on which the current module depends. With each of these modules in the runable state, the invoked procedure is ready for execution on the computer system 20 in step 117.

Referring now to FIGS. 6–9, to compile a module to the runable state 104 (FIG. 4), the module must first be compiled through each of the preceding compilation states 90–102 (FIG. 4) in sequence. Accordingly, as a first step 122 of the method 120 for compiling a module to the runable state 104, the compiler determines whether the module has previously been compiled to the addressable compilation state 102 which immediately precedes the runable compilation state. If not, the compiler performs the method 140 of FIG. 7 for compiling the module to the addressable state 102 as illustrated at step 124. The methods 140, 150, and 170 also include as their initial steps a determination of whether the module has yet been compiled to the immediately preceding compilation state, and a compiling to that state if it has not been. Accordingly, for a module which is being compiled for the first time to the runable state 104 (and is therefore in the semi-declared state 94 from the step 113 of FIG. 5), the compiler will determine that the module is not in the addressable state 102 at step 122 (FIG. 6), and at step 124 begin performing the method 140. In the method 140 (FIG. 7), the compiler will likewise determine at step 142 that the module is not in the compiled state 100, and perform the method 150 at step 144. In the method 150 (FIG. 8), the compiler determines that the module is not in the declared state 96 (step 152) and jumps to the method 170 at step 154. In the method 170 (FIG. 9), however, the compiler will determine at step 172 that the module has already been compiled to the semi-declared state 94, and can therefore proceed directly with the compilation to the declared state 96 (skipping the step 174).

Figure 9:
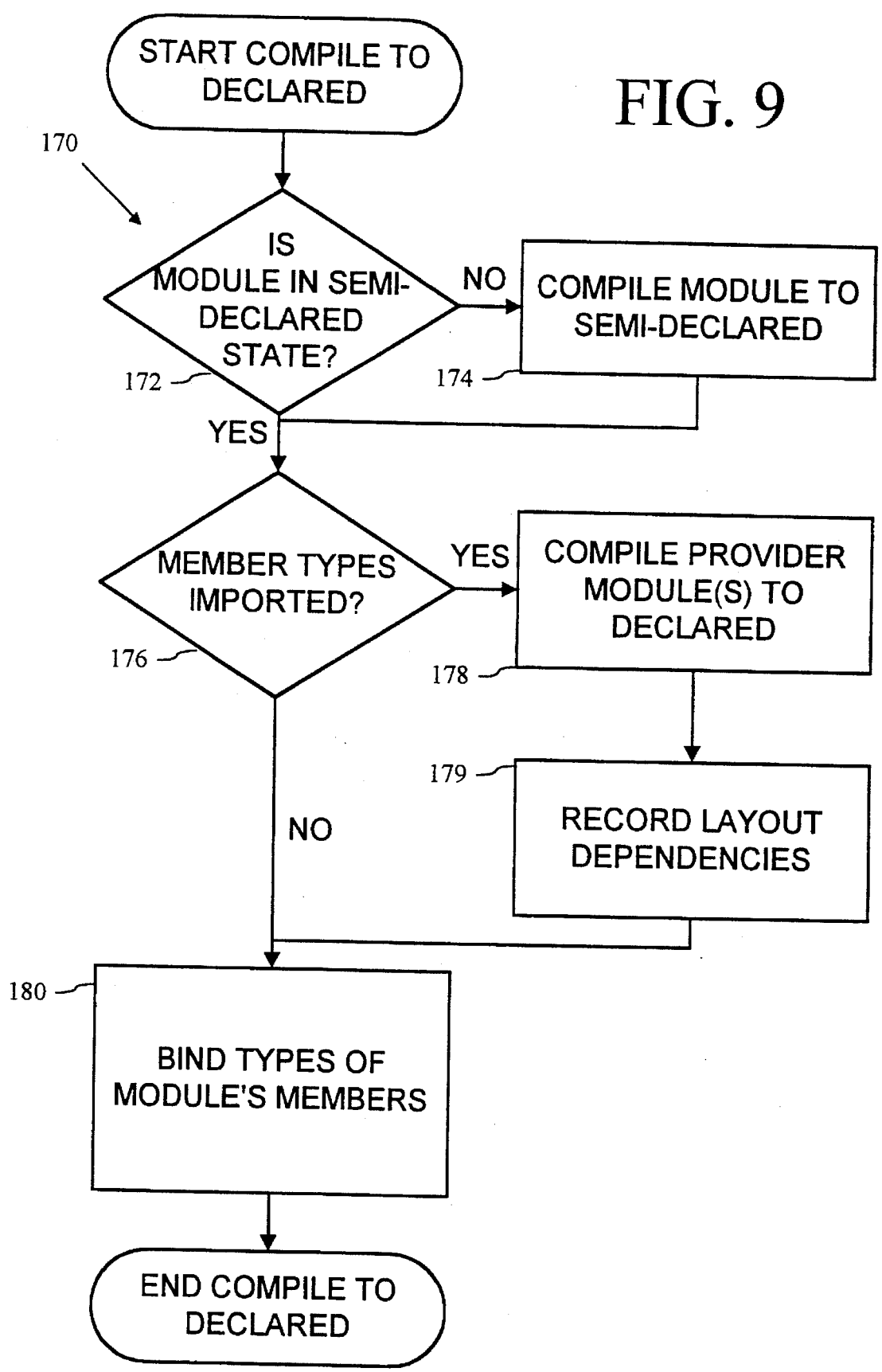
FIG. 9 is flow chart of a portion of the method of FIG. 5 for compiling to a declared state.

Referring now to FIG. 9, in compiling a module to the declared state 96 (FIG. 4), the compiler performs type binding (step 180) as described above with reference to FIG. 4. To bind the types of module members declared to be of types imported from (i.e. declared in) other ("provider") modules, the provider modules must first be compiled to the declared state 96. Accordingly, at step 176, whenever a data member of the module being compiled is declared to be of a type which is not either an intrinsic data element or a type defined in the same module, the compiler determines that such member's type is imported from another module. At step 178, the compiler then searches the symbol tables of other modules to determine which module is the provider module of the imported type, and performs the method 170 to compile that provider module to its declared state 96. (The provider module must also be compiled to the declared state 96 to bind the type being imported.) As described previously, data member declarations (e.g. statement 62 in FIG. 2) which import types create a layout dependency. Accordingly, at step 179, the compiler also records the layout dependency created by the statement importing the type. Finally, at step 180, the compiler completes type binding for the module's members by recording the type information in the module's symbol table (e.g. symbol table 80 of FIG. 3).

Figure 8:
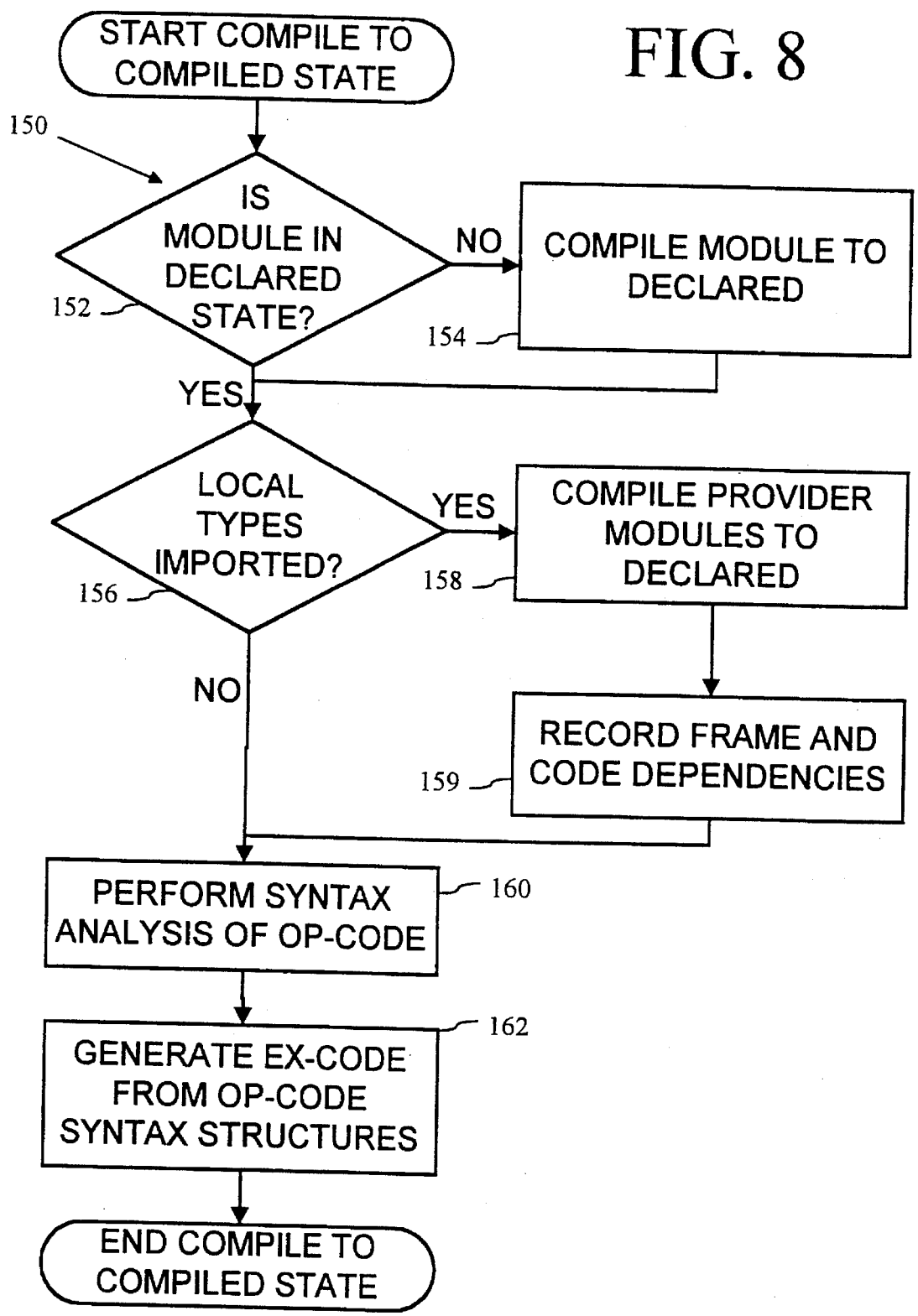
FIG. 8 is a flow chart of a portion of the method of FIG. 5 for compiling to a compiled state.

Referring now to FIG. 8, after compilation to the declared state 96 at step 154 using the method 170 (FIG. 9), the compiler can proceed with the module's compilation to the compiled state 100. To make the transition to the compiled state 100, the compiler performs syntax analysis (step 160) and generates excode (step 162) for the module's ex-code table as described above with reference to FIG. 4. To generate ex-code for statements in the module which declare local variables as types imported from other provider modules, or call procedures imported from other provider modules, the provider modules must first be compiled to the declared state 96s. Accordingly, at step 156, whenever a statement is encountered which declares a local variable of a procedure as a non-intrinsic type not defined in the module or which calls a procedure not defined in the module, the compiler determines that such local variable type or called procedure is imported from another module. At step 158, the compiler then searches the symbol tables of other modules to determine which module is the provider module of the imported type or procedure, and performs the method 170 to compile that provider module to its declared state 96. (The provider module must be compiled to the declared state 96 to bind the type or procedure being imported.) As described previously, local variable declarations (e.g. statement 70 in FIG. 2) which import types create a frame dependency. Additionally, statements calling an imported procedure (e.g. statement 72) create a code dependency. Accordingly, at step 159, the compiler also records the frame or code dependency created by the statement importing the type or procedure, respectively. Finally, at steps 160, 162, the compiler completes syntax analysis and ex-code generation for the module which is recorded in the module's ex-code table (e.g. ex-code table 86 of FIG. 3).

Figure 7:
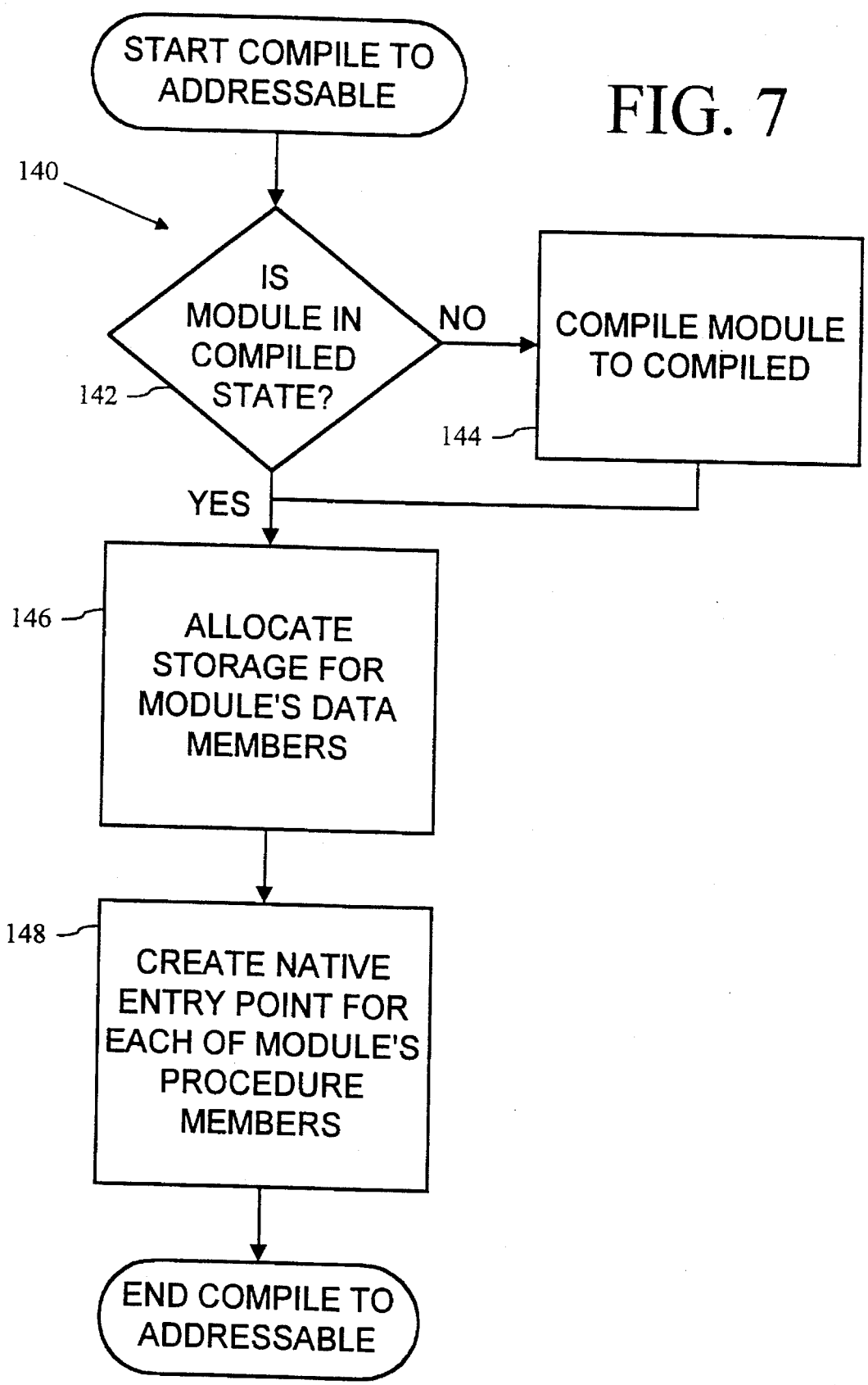
FIG. 7 is a flow chart of a portion of the method of FIG. 5 for compiling to an addressable state.

Referring now to FIG. 7, after compilation to the compiled state 100 at step 144 using the method 150 (FIG. 8), the compiler can proceed with the module's compilation to the addressable state 102. In going to the addressable state 102, the compiler at step 146 allocates storage in the memory 38 of the computer system 22 for the module's data members. As an example, for the "X" data member of the module M1 52 (FIG. 2) which is declared to be of the type "OrderPair" consisting of two integers (2 bytes each), the compiler allocates four bytes of storage. At step 148, the compiler also generates an ex-code sequence for activating each of the module's procedure-members. Such ex-code constitutes a "native-entry point" for that procedure member which allows the procedure member to be called from within the ex-code for another procedure. The addresses of the storage allocated for data members and of the native entry point generated for procedure members can be used by other procedures within the module or other modules to access the members.

Figure 6:
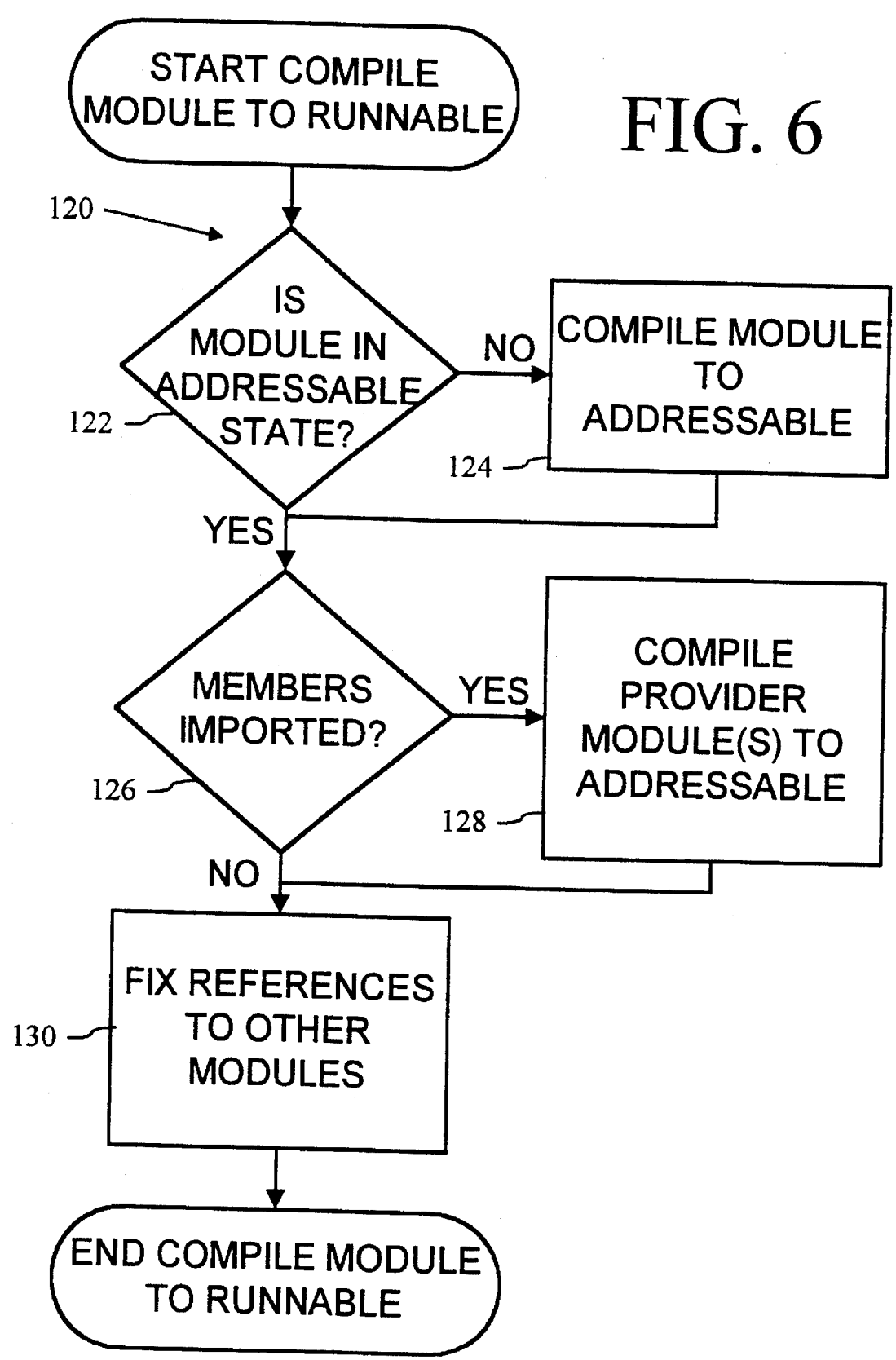
FIG. 6 is a flow chart of a portion of the method of FIG. 5 for compiling to a runable state.

Referring now to FIG. 6, after compiling to the addressable state 102 (FIG. 4) at the step 124 using the method 140

(FIG. 7), the compiler can proceed with the module's compilation to the runable state 104. To make the transition to the runable state 104, references in the ex-code of a module to data and procedure members imported from other provider modules are completed by obtaining and recording the addresses of such imported members. To obtain the address of an imported member, its provider module must first be compiled to the addressable state 102. Accordingly, the compiler determines at step 126 whether any provider module members are imported by the module. In the preferred embodiment of the invention, the compiler generates an import address table (not shown) while compiling the module to the compiled state in which the compiler records a handle (data identifying the member and its provider module) for each such imported member. The compiler can then determine that the module imports members of other provider modules by traversing this table. Alternatively, the compiler can locate references to imported members in the op-code by traversing the op-code table. At step 128, the compiler compiles the imported member's provider modules to the addressable state 102. Finally, at step 130, the compiler completes the references to imported members, such by recording their addresses in the import address table. The module is then compiled to the runable state 104. (As shown at steps 116–177 of FIG. 5, before executing any procedures of the module, the provider modules must also be compiled to the runable state 104.

Referring to FIGS. 3 and 4, the import table 82 (FIG. 3) is used according to the invention to minimize the time required to recompile the program after an edit. In the preferred embodiment of the invention, the user can further modify a program's source code (e.g., the source code 50 of FIG. 2) after compilation using the text editor of the integrated development environment.

According to the invention, only edited modules and modules dependent on the edited module may need to be recompiled. In the preferred embodiment, a separate decompilation process is automatically initiated by an edit. Modules which have been decompiled may thereafter be recompiled when the compilation process (method 110 of FIG. 5) is again performed. In the decompilation process, any edited modules are decompiled to one of the compilation states 92, 94, 96, 98 (FIG. 4) according to the respective edit performed. Modules which are dependent on the edited module are decompiled to one of the intermediate compilation states 92, 96, 98 according to the type of dependency affected by the edit. When later compiling any decompiled module, the compiler recompiles such module from the intermediate state to which it was decompiled.

More particularly, in the case of a dependent module having layout dependency affected by editing (or an edited module whose layout is affected by an edit), such module is decompiled to the undeclared compilation state 92 (FIG. 4). Decompiling to the undeclared state is effected by deleting the excode table 86 and symbol table 80 for the module. In any later compiling involving the module, the module is compiled from the undeclared state as described above. This determines the layout of the module anew. For example, the module m1 52 (FIG. 2) has a layout dependency 74 on the OrderPair type member 64 of the module 54. After an edit which modifies the OrderPair type member 64, the module M1 54 is decompiled to the undeclared state 92 because its layout is affected by the edit. Because the edit affects the layout dependency 74 of the module 52, the module M1 52 also is decompiled to its undeclared state 92. The modules M1 52, M2 54 are then recompiled from that state in a subsequent compilation involving these modules.

In the case of a dependent module having at most a frame dependency affected by editing (or an edited module whose procedure frames are affected by an edit) such dependent module is decompiled to the declared compilation state 96 (FIG. 4). Because the layout of these modules is not affected by the edit, not as much of the compiling process need to be repeated. To decompile a module to the declared state, the compiler deletes its excode table 46. The symbol table 80 (which records data relating to the module's layout), however, is retained. For example, the module M1 52 (FIG. 2) has a frame dependency 76 on the "Box" type member 66 of the module M3 56. After an edit which modifies the Box type member 66 (and doesn't affect any layout dependency of the module 52), the module M1 52 is decompiled to its declared state 96, and may later be recompiled from that state.

In the case of a dependent module having at most a code dependency affected by an edit, the dependent module is decompiled to the regenerate compilation state 98 (FIG. 4). In decompiling to the regenerate state, the compiler retains data in a module's excode table relating to the local variables (and the local variables' types) of the module's procedure members (which determines he frames for the procedure members). When subsequently recompiling from the regenerate state 98, the compiler again generates the ex-code for each of the module's procedure members form their op-codes, but does not again generate data relating to the procedure members' local variables. Since the local variable data for the module's procedure members is not again generated, less compiling is required to bring a module to the compiled state 100 from the regenerate state 98, than from the declared state 96. For example, the module M1 52 (FIG. 2) has a code dependency 78 on the "ReadPel( )" procedure member 68 of the module M4 58. Accordingly, after an edit of the module M4 58 which modifies the "ReadPel( )" procedure member 68, the compiler decompiles the module M1 52 to the regenerate state 98, and may later recompile the module from that state.

Figure 11:
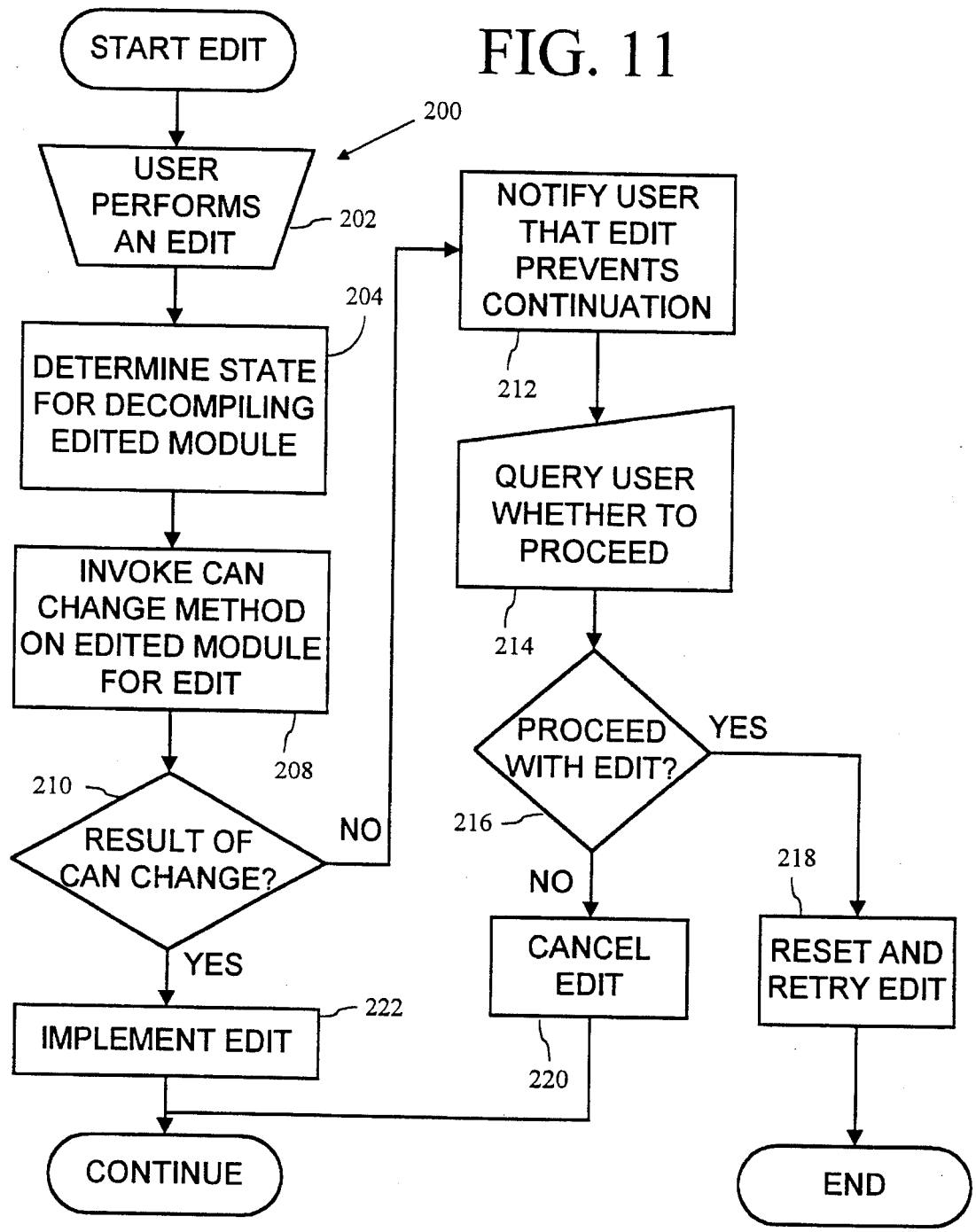
FIG. 11 is a flow chart of a method for decompiling a program after an edit according to a preferred embodiment of the invention.

Referring to FIG. 11, the compiler in the preferred embodiment of the invention utilizes a method 200 to decompile a program after an edit. The method 200 minimizes recompilation of a program after an edit by decompiling dependent modules to one of the undeclared, declared or regenerate compilation states 92, 96, or 98 (FIG. 4) according to the type of the module's dependency which is affected by the edit. The method 200 also provides for continuing execution of a currently executing program, if possible, after an edit (such as where a new procedure can be added without interfering with the currently executing program). The method 200 therefore blocks edits which interfere with continuation of the current execution state of a program.

As indicated at a step 202 of the method 200 (FIG. 11), decompilation is initiated by the user performing an edit to a program. Edits are preferably performed utilizing various text editing functions (e.g. conventional text editing functions such as cut, copy, paste, etc..) provided by the integrated development environment of the preferred embodiment for editing of the program's source code. The method 200 is preferably triggered for each atomic edit action (i.e. a separate editing action, such as a cut operation or a paste operation of one or more words or statements of source code in the program). The atomic edit action changes the source code text of a module (the "edited module") at the user interface level.

The compiler next determines whether the edit would actually prevent continuation. To make this determination, the compiler at step 208 invokes a method (the "can change method") 230 (FIG. 12) described below which returns a positive result if continuation is possible after the edit and a negative result if not. As described more fully below, those modules including the edited module which can be changed without preventing continuation also are decompiled as part of the can change method 230. Depending on the result of invoking the can change method 230 at step 208, the compiler determines at step 210 whether to proceed with the edit. If the result of the method 230 is affirmative, the compiler will have already decompiled the edited module as required by the edit. The compiler then accepts the edit at step 223, such as by making changes to the op-code of the edited procedure corresponding to the edit. After accepting the edit, the program continues execution at step 224.

A negative result of the can change method 230, however, indicates that the current execution state of the program cannot continue after the edit. Accordingly, if the result of the can change method 230 is negative, the compiler will notify the user that the edit would prevent continuation (step 212) and queries the user whether to proceed anyway (step 214). As indicated by steps 216, 218, if the user chooses to proceed, the compiler discards the current execution state of the program such as by resetting the virtual machine engine. The compiler then repeats the method 200 again for the edit. (After the current execution state is discarded, continuation is generally possible regardless of the edit performed.) If the user chooses not to proceed with the edit, the compiler cancels the edit at step 220 and continues execution of the program from the current execution state at step 224.

Figure 12:
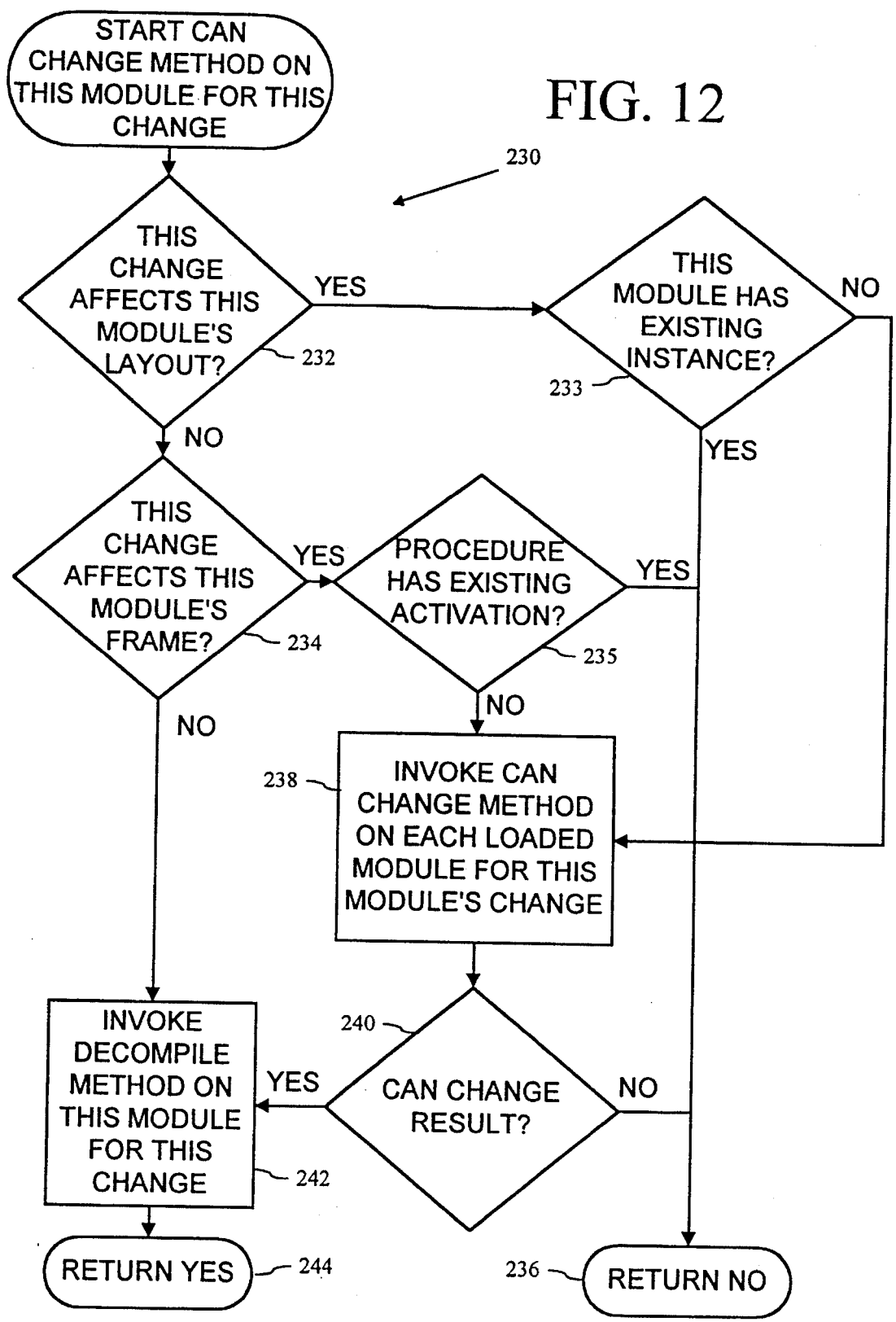
FIG. 12 is a flow chart of a portion of the method of FIG. 11 for determining whether a currently executing program can be continued after an edit.

With reference to FIG. 12, the can change method 230 is first invoked at step 208 within the method 200 to determine whether the edit to the edited module prevents continuation. During this initial iteration of the method 230, the edited module is referred to as "this module" and the edit is referred to as "this change." The can change method 230 also may be invoked from within the method 230 itself to determine whether a change to a first module affects any other module so as to prevent continuation. During these iterations of the method 230, the other module is referred to as "this module" and the change to the first module is referred to as "this change." Because further iterations of the method 230 can be invoked by a previous iteration, the can change method 230 is considered to be a recursive method.

In the preferred embodiment of the invention, there are two conditions which prevent continuation of the current execution state. A first is where a change affects the layout of a module, and there are existing instances of the module in the currently executing program. A second condition is where a change affects the frame of any procedure of a module, and there are existing activations of that procedure in the currently executing program. In the method 230, the compiler performs checks at steps 232–235 to determine whether either of these conditions obtain for the module and change being considered in the current iteration of the method 230 (i.e. "this module" and "this change"). If either of the conditions are met, the change prevents continuation. The compiler therefore returns a negative result at step 236 for that iteration of the can change method 230.

In situations where "this change" affects "this module's" layout or procedure frames, the effect of the change may propagate to other modules. Accordingly, where "this module's" layout or procedure frames are affected (but no instances or procedure activations of "this module" exist which prevent continuation), the method 230 is invoked recursively at step 238 for each loaded module to determine whether the effect of "this change" on "this module's" layout or frame prevents continuation. In these further iterations of the method 230, the effect of the current iteration's "this change" on the layout or frame of the current iteration's "this module" is considered to be "this change." The other loaded modules in turn are considered "this module" in each of the further iterations. For example, in a first iteration of the method 230, the edit and the edited module are "this change" and "this module," respectively. In further iterations of the method 230 invoked at step 238 of the first iteration, the edit is still "this change." However, each of the loaded modules are in turn "this module" in those further iterations. Still further iterations of the method 230 may be invoked if the edit affects the layout or frames of any of these loaded modules. In such still further iterations, the effect of the edit on that loaded module is "this change" and each of the other modules are in turn "this module." Such successive iterations of the method 230 continue until the checks of steps 232–235 are made on all loaded modules for the edit and the effect of the edit on each module's layout and frames.

In situations where "this change" does not affect the layout or procedure frames of "this module," "this change" also does not affect other modules which may be dependent on "this module." "This change" can then be made without preventing continuation. Accordingly, the compiler proceeds in such situations directly from the step 234 to a step 242 where "this module" is decompiled according to a decompile method 50 illustrated in FIG. 13.

At step 240, after further iterations of the can change method 230 have been invoked at step 238, the compiler determines whether the result of any of the further iterations is negative. If any negative results are returned, the compiler returns a negative result for the current iteration at step 236. If all iterations invoked at step 240, however, have a positive result, then "this module" in the current iteration of the can change method 230 can be decompiled without preventing continuation. Accordingly, the compiler proceeds to step 242 where the module is decompiled according to the decompile method 250 illustrated in FIG. 13. Finally, at step 244, the compiler returns an affirmative result for the current iteration of the can change method 230. The negative or affirmative results are returned at steps 236 and 244, respectively, to the method which invoked the current iteration of the can change method (i.e. either the step 208 of the method 200 in FIG. 11 for the first iteration or the step 238 of the method 230 for further iterations).

Figure 13:
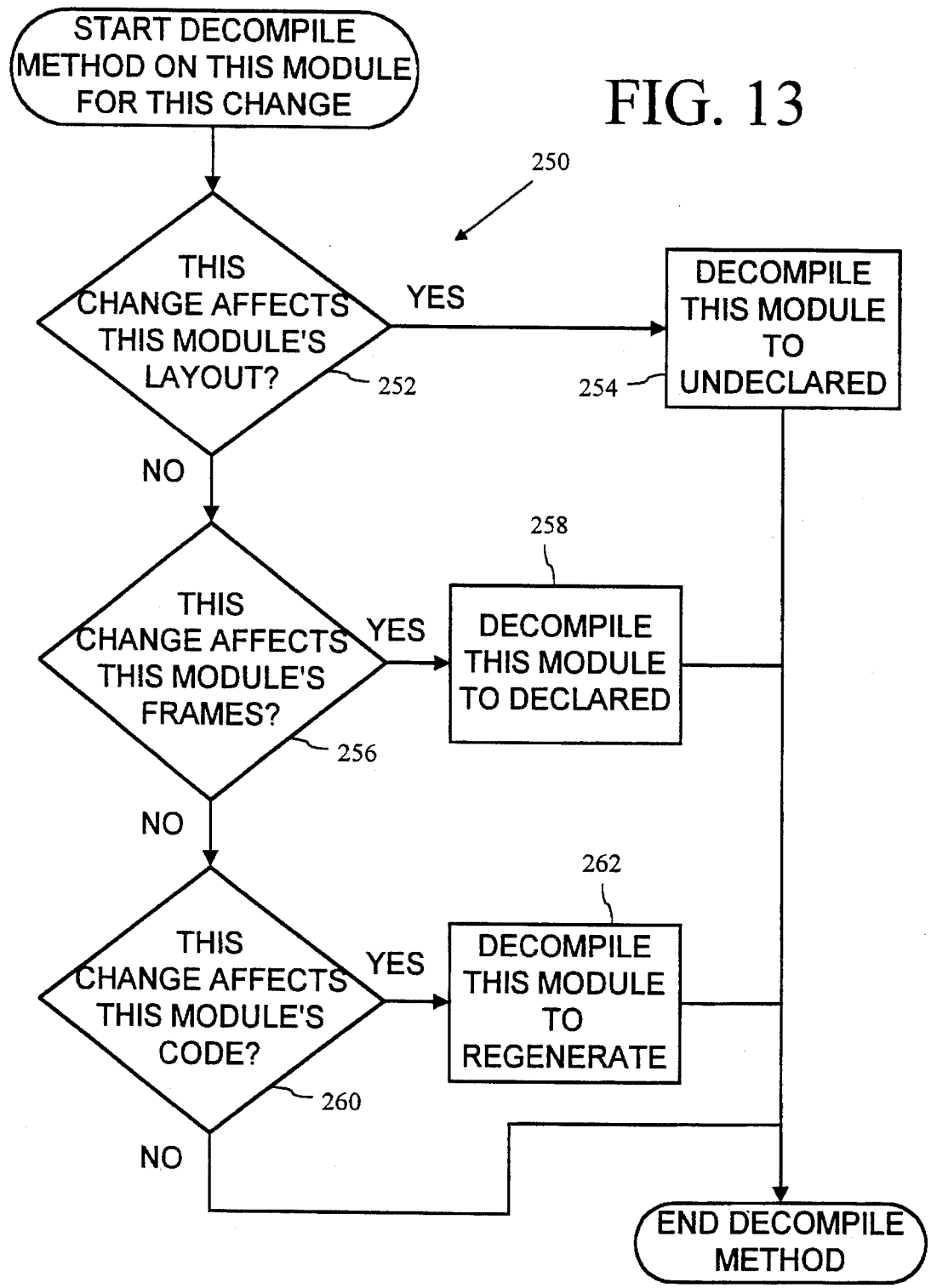
FIG. 13 is a flow chart of a portion of the method of FIG. 11 for decompiling a module to a particular one of the compilation states illustrated in FIG. 4 according to the the of the module's dependency.

With reference to FIG. 13, the decompile method 250 is invoked at step 242 of the can change method 230 (FIG. 12) for the module and change considered as "this module" and "this change" in the current iteration of the can change method. As described above, in the first iteration of the can change method "this change" and "this module" are the edit and the edited module, respectively. In subsequent iterations of the can change method, "this change" is the effect of the edit on a first module's layout or frame and "this module" is another of the loaded modules.

Depending on the effect of "this change" on "this module," the decompile method may decompile "this module" to one of the undeclared, declared, or regenerate states 92, 96, 98 (FIG. 4). As described above, changes which affect the layout of a module cause decompilation to the undeclared state 92. On the other hand, changes affecting a module's procedure frames or the procedures code cause decompilation to the declared state 96 or the regenerate state 98, respectively. Further, changes causing decompilation to the undeclared state 92 are highest in precedence, while changes causing decompilation to the regenerate state 98 are of least precedence. Accordingly, the compiler first determines at step 252 whether "this change" affects the layout of "this module." If the layout is affected, the compiler decompiles "this module" to the undeclared state 92 at step 254. Otherwise, the compiler determines at step 256 whether "this change" affects "this module's" procedure frames. If the procedure frames are affected, the compiler decompiles "this module" to the declared state 96 at step 258. Finally, if neither the layout or procedure frames of "this module" are affected, the compiler determines at step 260 whether the code of the procedures in "this module" are affected by "this change." If the procedure code is affected, "this module" is decompiled at step 262 to the regenerate state 98. If none of the layout, procedure frames, or procedure code is affected by "this change," then "this module" is not decompiled.

Referring now to FIGS. 11–13, the methods 200, 230 and 250 minimize the recompilation of a program after an edit by decompiling various modules of the program only to the extent they are affected by the edit. For example, edits which do not alter the layout or procedure frames of the edited module, also do not affect dependencies of other modules. In such a case, during the first iteration of the can change method 230 (FIG. 12) invoked at step 208 (FIG. 11), the compiler determines that the layout and procedure frames of the edited module are not affected by the edit in steps 232, 234 (FIG. 12). The compiler then proceeds directly to invoke the decompile method 250 (FIG. 13) for the edited module at the step 242 in FIG. 12 (without recursively invoking the can change method for other loaded modules as at the step 238 in FIG. 12). In the decompile method 250 (FIG. 13), the compiler performs the steps 252, 256, 260, 262 and determines that the edited module need be decompiled to only the regenerate state 98. As continuation is possible after this edit, the can change method 230 returns an affirmative result at step 244 (FIG. 12). The compiler then accepts the edit at the step 222 (FIG. 11) of the method 200.

As a further example, an edit which affects the layout or procedure frames of the edited module also may require changes to the compiled state of other modules which have dependencies on the edited module. Such an edit, as well as the changes to the compiled states of the other modules, may prevent continuation of the current execution state. Accordingly, in a first iteration of the can change method 230 which is invoked at step 208 (FIG. 11) of the method 200, the compiler at the steps 232–235 (FIG. 12) will determine whether the effect of the edit on the edited module would prevent continuation. If continuation is prevented, the compiler returns a negative result for the can change method at step 236 (FIG. 12), and then allows the user to choose whether to proceed or cancel the edit (steps 212–220 in FIG. 11).

If continuation is not prevented, the compiler proceeds to recursively invoke the can change method for each of the loaded modules at the step 238 (FIG. 12). In these further iterations of the can change method, the compiler determines whether the effect of the edit on other modules prevents continuation (by repeating steps 232–235 for these modules). Again, if continuation is prevented, the compiler returns a negative result for the can change method (steps 240, 236 in FIG. 12), and allows the user to choose whether to proceed or cancel the edit (steps 212–220 in FIG. 11). However, if continuation is still possible, those modules whose layout, procedure frames, or code are affected by the edit (such as due to a dependency on the edited module) are decompiled accordingly by the decompile method 250 (FIG. 13) invoked at step 242 in the respective iterations of the can change method for such modules. The edited module and each dependent module affected by the edit are thus decompiled to one of the undeclared, declared, or regenerate states depending upon the effect of the edit on that module. Since the modules are decompiled only to the extent that they are affected by the edit, recompilation after the edit is minimized.

Referring again to FIG. 4, in the preferred embodiment of the invention, various modules of a program can be saved to non-volatile secondary storage 40 of the computer system 20 (FIG. 1) in any of the undeclared state 92, the semi-declared state 94, the declared state 96, the regenerate state 98, and the compiled state 100. (After performing the various compilation and decompilation methods illustrated in FIGS. 5–13, the modules of a program may be in various different compilation states.) Each module is saved with any of the various tables (e.g. the op-code table 84, the symbol table 80, the import table 82, and the ex-code table 86 in FIG. 3) which have been generated for the module in its transition to its current state. For example, a module in the undeclared state has only an op-code table. Accordingly, only the op-code table for modules in the undeclared state is saved. Modules in the semi-declared and declared states 94, 96, however, are saved with their op-code table, symbol table, and import table. The ex-code tables of modules in the regenerate and greater states are additionally saved. When modules are saved in any of the states 94, 96, 98, or 100, less of the compiling process illustrated in FIGS. 4–10 is repeated when the modules are again loaded and executed. Accordingly, by saving modules in any of the various states 92, 94, 96, 98, or 100, compiling is further minimized.

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method for incrementally compiling a computer program organized as a plurality of modules, comprising the steps of:

compiling the program a first time;

compiling the program a second time after an edit is preformed to one of the module's source code, the edit affecting a dependency of a dependent module on the edited module;

wherein the step of compiling the first time comprises compiling each of the modules through a sequence of compilation states, the sequence including at least an uncompiled state, a plurality of intermediate compilation states, and a complied state, the compilation states being associated with the modules; and wherein the step of compiling the second time comprises the steps of:

decompiling the dependent module to one of the intermediate compilation states according to the type of the dependency affected by the edit; and compiling the dependent module to the coupled state from the intermediate compilation state.

2. The method of claim 1 wherein the step of compiling the first time comprises the step of:

for the dependency of the first dependent module on the edited module, recording data in an entry of an import table indicative of the type of the dependency out of a plurality of dependency types, including dependency types relating to at least one of the dependent module's layout, frame, and code; and wherein the step of compiling the second time comprises the step of:
   detecting that the dependency of the dependent module recorded in the import table is affected by the edit.

3. The method of claim 2 wherein the step of compiling the first time comprises the step of:
   recording data in the import table entry indicative of an identify of the module on which the dependent module has the type of dependency.

4. The method of claim 3 wherein the step of compiling the first time comprises the step of:
   recording data in the import table entry indicative of an identity of a member of the module on which the dependent module has the type of dependency.

5. The method of claim 1 wherein, when the edit affects a layout type dependency of the dependent module on the edited module:
   the step of decompiling the dependent module to said intermediate state comprises decompiling the dependent module to an undeclared compilation state; and
   the step of compiling the dependent module to the complied state comprises compiling the dependent module form the undeclared compilation state.

6. The method of claim 1 wherein, when the edit affects a frame type dependency of the dependent module on the edited module:
   the step of decompiling the dependent module to said intermediate state comprises decompiling the dependent module to a declared compilation state; and
   the step of compiling the dependent module to the compiled state comprises compiling the dependent module from the declared compilation state.

7. The method of claim 1 wherein, when the edit affects a code type dependency of the dependent module on the edited module:
   the step of decompiling the dependent module to said intermediate state comprises decompiling the dependent module to a regenerate compilation state; and
   the steps of compiling the dependent module to the compiled state comprises compiling the dependent module form the regenerate compilation state.

8. The method of claim 1 comprising:
   where the edit affects a code type dependency of the dependent module on the edited module, the step of decompiling the dependent module to said intermediate state comprises decompiling the dependent module to a regenerate compilation state and the step of compiling the dependent module to the compiled state comprises compiling the dependent module from the regenerate compilation state;
   where the edit affects a frame type dependency of the dependent module on the edited module, the step of decompiling the dependent module to said intermediate state comprises decompiling the dependent module to a declared compilation state and the step of compiling the dependent module to the compiled state comprises compiling the dependent module from the declared compilation state, and
   wherein the edit affects a layout type dependency of the dependent module on the edited module, the step of decompiling the dependent module to said intermediate state comprises decompiling the dependent module to an undeclared compilation state and the step of compiling the dependent module to the compiled state comprises compiling the dependent module from the undeclared compilation state.

9. A computer program stored on a computer readable storage medium and having code for performing the method of claim 8 on a computer.

10. The method of claim 1 comprising:
   storing the dependent module in a first one out of the sequence of compilation states into a non-volatile storage between the steps of compiling the first time and compiling the second time; and
   wherein the step of compiling the second time comprises:
      decompiling the dependent module to one of the intermediate compilation state according to the type of the dependency upon loading the dependent module from the non-volatile storage.

11. A computer program stored on a computer readable storage medium and having code for performing the method of claim 10 on a computer.

12. A computer program stored on a computer readable storage medium and having code for performing the method of claim 1 on a computer.

13. A method for incrementally compiling a program having a plurality of modules and a statement in a first module which creates an intermodule dependency on a second module, the intermodule dependency having one of a plurality of dependency types, the method comprising:
   compiling the program through a sequence of compilation states into code executable on a computer, the sequence including a plurality of intermediate compilation states;
   performing an edit on the program affecting the intermodule dependency;
   decompiling the first module to one of the intermediate compilation states responsive to the type of the intermodule dependency; and
   compiling the first module from the intermediate compilation state.

14. The method of claim 13, comprising;
   recording data indicative of the intermodule dependency on the second module and its type in a table; and
   determining whether the edit to the second module affects the intermodule dependency of the first module from the data in the table.

15. A computer program stored on a computer readable storage medium and having code for performing the method of claim 13 on a computer.

16. A method of incrementally compiling source code, comprising:
   compiling the source code from one of more modules into executable code, a module having a layout, a frame, and code;
   editing the source code;
   for each module affected by the editing,
      decompiling the module to a first intermediate compilation state if the editing affected the module's layout;
      decompiling the module to a second intermediate compilation state if the editing affected the module's frame;
      decompiling the module to a third intermediate compilation state if the editing affected the module's code; and
      compiling the module from its respective intermediate compilation state.

17. A computer program stored on a computer readable storage medium and having code for performing the method of claim 16 on a computer.

18. A compiler for generating executable code of a program having a plurality of modules, comprising:

an import table for storing data relating to dependencies between modules of the program;

a layout generator for generating a layout of each of the modules to thereby compile the modules from a first compilation state to a second compilation state, the layout generator recording data in the import table relating to layout dependencies of the modules;

a frame generator for generating procedure flames of each of the program's modules to thereby compile the modules from the second compilation state to a third compilation state, the frame generator recording data in the import table relating to frame dependencies of the modules;

a code generator for generating executable code for each of the program's modules to thereby compile the modules from the third compilation state into a final state, the code generator recording data in the import table relating to code dependencies of the modules;

a program editor for performing an edit to the program; and a decompiler for decompiling modules having a layout dependency affected by the edit to the first compilation state, for decompiling modules having a frame dependency affected by the edit to the second compilation state, and for decompiling modules having a code dependency affected by the edit to the third compilation state;

the layout generator, frame generator, and code generator compiling those modules which are decompiled to the first compilation state, second compilation state, and third compilation state, respectively.

19. The compiler of claim 18 wherein the executable code generated by the code generator is virtual machine code, the compiler comprising:

a virtual machine engine for executing the executable code of the modules generated by the code generator.

* * * * *